R. G. ISENBERG AND H. E. HEDREN.
UNLOADING DEVICE.
APPLICATION FILED NOV. 5, 1920.
1,410,680.
Patented Mar. 28, 1922.
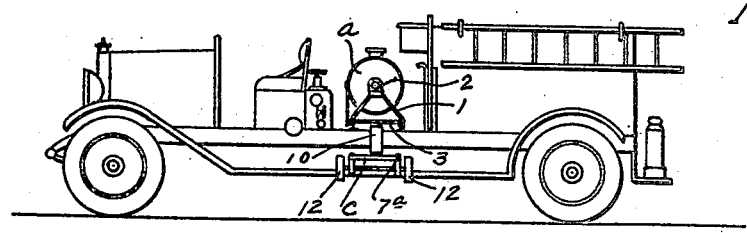
Fig.1
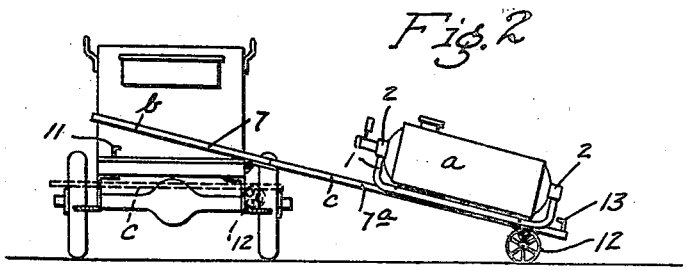
Fig.2
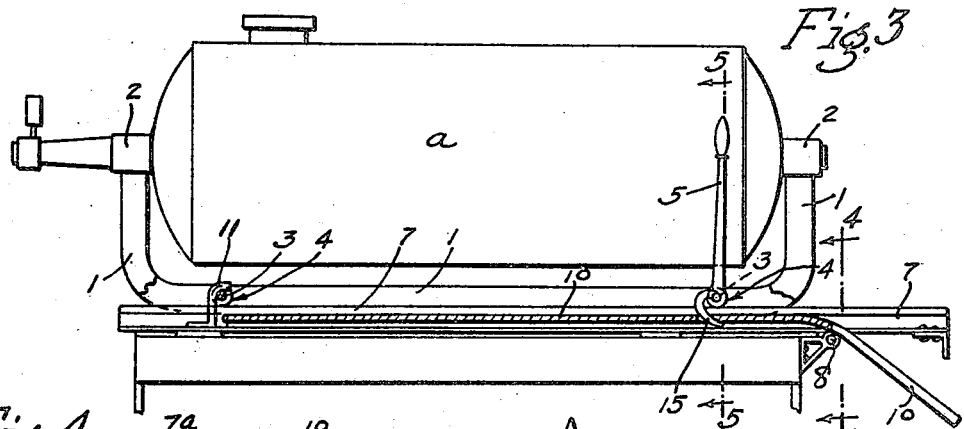
Fig.3
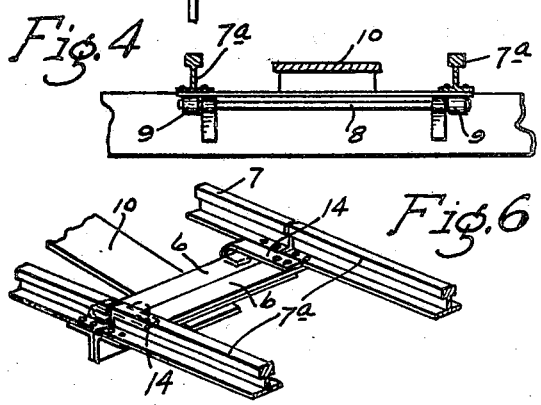
Fig.4
Fig.6
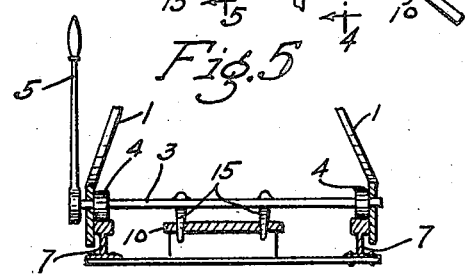
Fig.5
INVENTORS
Robert G. Isenberg
Harry E. Hedren
BY THEIR ATTORNEY
James F. Williamson

UNITED STATES PATENT OFFICE.

ROBERT G. ISENBERG AND HARRY E. HEDREN, OF LAFAYETTE, MINNESOTA.

UNLOADING DEVICE.

1,410,680.      Specification of Letters Patent.      Patented Mar. 28, 1922.

Application filed November 5, 1920. Serial No. 422,110.

*To all whom it may concern:*

Be it known that we, ROBERT G. ISENBERG and HARRY E. HEDREN, citizens of the United States, residing at Lafayette, in the county of Nicollet and State of Minnesota, have invented certain new and useful Improvements in Unloading Devices; and we do hereby declare the following to be a full, clear, and exact description of the invention, such as will enable others skilled in the art to which it appertains to make and use the same.

The present invention relates to an unloading device, and particularly to such a device designed for supporting a chemical tank on a fire truck and for unloading the tank from the same. In the fire equipment used in villages and small towns it is customary to use a chemical tank of relatively large size. This tank, when filled with the fire extinguishing fluid, is of great weight, usually weighing from 500 to 1000 pounds. In order to use this tank efficiently, it is necessary to provide means for conveying it into the most advantageous position relative to the fire. And such positions can often not be reached by the automobile or other truck used to carry the tank.

It is an object of this invention, therefore, to provide a carrying and unloading means for such a tank by which the same can be quickly and conveniently displaced from the large truck and transported to the desired position for use.

A further object of the invention is to provide such a device which is separable, a part thereof forming the normal support for the tank on the truck and the other part being capable of convenient attachment to the truck to be carried thereby.

Other objects and advantages of the invention will appear as the description proceeds, in connection with the accompanying drawing, in which like reference characters refer to the same parts throughout the different views, and in which Fig. 1 is a side elevation of an automobile fire truck showing the chemical tank and the supporting and unloading device;

Fig. 2 is a somewhat diagrammatic view in end elevation of a fire truck showing the unloading device in unloading position;

Fig. 3 is a sectional view taken transversely of the truck showing the chemical tank in normally supported position;

Fig. 4 is a sectional view taken on the line 4—4 of Fig. 3;

Fig. 5 is a sectional view taken on the line 5—5 of Fig. 3; and

Fig. 6 is a perspective view of portions of the device.

Referring to the drawings, in Fig. 1 is shown an automobile fire truck which has transversely supported thereon a chemical tank 2. The tank $a$ is normally supported on a tilting device $b$, and with the device $b$, as shown in Fig. 2, a separable truck device $c$ is designed to co-operate.

The tank $a$ is supported upon a pair of arms 1 which extend in spaced longitudinal relation to the tank and have upwardly extended end portions which converge into and are joined to hub members 2, through which extend supporting trunnions projecting axially from each end of the tank. The arms 1 are connected near each end thereof by cross rods 3 which carry rollers 4. These rollers constitute the supporting members upon which the tank is normally carried. A hand lever 5 is connected to one end of one of the rods 3 and this rod is provided with depending hooks 15, for a purpose to be later described.

The member $b$ comprises a pair of suitably spaced track rails 7 which are connected near their ends by cross members 6 suitably secured thereto by bolts or rivets. As shown in Figs. 2 and 3, the member $b$ projects some distance beyond the side of the truck frame. The same is also pivoted to the side of the truck frame by means of a pivot bar 8 which passes through suitably spaced supporting brackets secured by the frame and receives the lugs 9 secured to the undersurface of a plate connecting the rails 7. Also, extending across the truck frame and firmly secured thereto is a plate 10 disposed centrally of the rails 7 and which has a downwardly turned end projecting from one side of the truck beneath the projecting ends of the rails. Stop members 11 which are formed by upstanding brackets having bent over ends, are secured near one end of the rails 7. When the tank $a$ is in its normal position on the truck, as shown in Fig. 3, the cross member 3 at one end of the supporting arms 1 contacts with the stop members 11 and the lever 5 is turned to upright position so that the hook members 6 engage through suitable holes formed in the plate member 10. The tank is thus accurately located and held in position.

The separable member *c* also comprises a pair of track rails 7ª spaced similarly to the rails 7 and suitably connected by end and intermediate cross members bolted or riveted thereto. A pair of truck wheels 12 are connected to the rails 7ª in any suitable manner and stop members 13 are also arranged to project upwardly at one end thereof. As above stated, the member *b* is adapted to be tilted into the inclined position shown in Fig. 2 and the member *c* has projecting from the cross piece at one end thereof suitably secured hook members 14 adapted to hook over a cross piece 6 at the end of rails 7. The member *c* then occupies the position shown in Fig. 2. The outer end of the member *b* and the adjacent end of member *c* are both rigidly and strongly supported by the overhanging end of plate 10.

With the members *b* and *c* in this position, the tank *a* which has been previously released from plate 10 by swinging the hand lever 5, can be quickly conveyed down the rails until it contacts with the stop members 13 which are adapted to contact with one of the cross rods 3. The truck member *c* can then be moved slightly toward the automobile truck, the hook members 14 released and the tank transported to the desired location, the rails 7ª forming convenient truck handles. When it is desired to again load the empty or partially empty tank *a*, the member *c* will again be brought into the position shown in Fig. 2, the tank run up the tracks onto member *b* when the member *c* can be unhooked. The member *b* will then swing to its normal horizontal position, the tank can be moved against stop members 11 and again locked in position by turning lever 5. It will be noted as shown in Fig. 1, that the member *c* is of such construction that it can very conveniently be carried by projecting the track 7ª transversely across the automobile truck frame and supporting the same on the runningboard or other members provided for that purpose.

From the above description, the operation of the applicants' device will be clearly understood. The device is seen to be of simple construction and one having great utility, and which greatly adds to the efficiency and flexibility of the fire equipment. The same is so arranged on the truck that it does not require additional space, but is skillfully combined with a normal tank supporting means.

It will, of course, be understood that various changes may be made in the form and details of the device without departing from the scope of the applicants' invention, which, generally stated, consists of the matter shown and described and set forth in the appended claims.

What is claimed is:

1. An unloading device for a chemical tank carried by a vehicle having in combination means adapted normally to extend across the vehicle for normally supporting said tank, and constructed and arranged to tilt to unloading position, and separable means comprising a wheeled structure adapted to be connected to the end of the first mentioned means and aligned therewith and onto which the tank is adapted to be moved.

2. An unloading device for a chemical tank carried by a fire truck having in combination a pair of track rails upon which the tank is normally supported, said rails being suitably connected and pivoted to one side of the truck frame and adapted to swing into an inclined position, a separable member comprising a pair of similar rails having means at one end for connection to the ends of the first mentioned rails so that said rails will be in alignment, and a pair of truck wheels connected near the other ends of the rails of the separable member.

3. A device for unloading a chemical tank from a fire truck having in combination a supporting member comprising a pair of track rails upon which the tank is normally supported, stop members near one end of said rails for determining the normal position of the tank, said rails being pivoted at one side of the truck and extending beyond said side, and a plate supported by the truck and disposed centrally between said rails having an overhanging depending end at the side of the truck, said plate having an opening therein adapted to co-operate with means on said tank for locking the same in normal position, said overhanging end of the plate forming a supporting means for the track rails when the same are swung to unloading position.

4. A chemical tank supporting and unloading device having in combination a pair of arms extending longitudinally of said tank beneath the same, having their ends bent upwardly and converging into and supporting hubs adapted to receive supporting trunnions extended axially from the tank, cross rods connecting said arms near each end thereof, supporting rollers carried by said cross members, a pair of depending hooks also carried by one of said cross members, a handle secured to said cross member at the outer side of one of said arms, a tiltable supporting track member for supporting said rollers, and a plate member extending longitudinally between said track members and having apertures therein with which said hook members are adapted to engage to lock the tank in normal position.

5. A device for unloading a chemical tank from a fire truck having in combination a tilting means comprising a pair of track rails for normally supporting the tank, a cross member near one end of the rails rigidly connecting the same, a separable device that comprises a pair of similar track rails, a connecting device at the end of said last mentioned rails having hook members secured thereto adapted to engage with the cross members at the end of the first mentioned rails when the tilting member is swung to its tilted position, whereby the two sets of track rails are held in alignment in inclined position, and wheels secured to and supporting the last mentioned tracks near their other end.

6. A device for unloading a chemical tank from a fire truck having in combination a pair of suitably spaced track rails, a member connecting the same at one end thereof, hook members secured to and extending from said cross member beyond the end of the rails, stop members at the other end of the rails and a pair of truck wheels secured to the track members near the end carrying the stop member.

In testimony whereof we affix our signatures in presence of two witnesses.

ROBERT ISENBERG.
HARRY E. HEDREN.

Witnesses:
LOUIS ISENBERG,
HARRY A. SWENSON.